Aug. 21, 1928.    J. C. DIEHL    1,681,174
ORIFICE METER
Filed Dec. 12, 1924
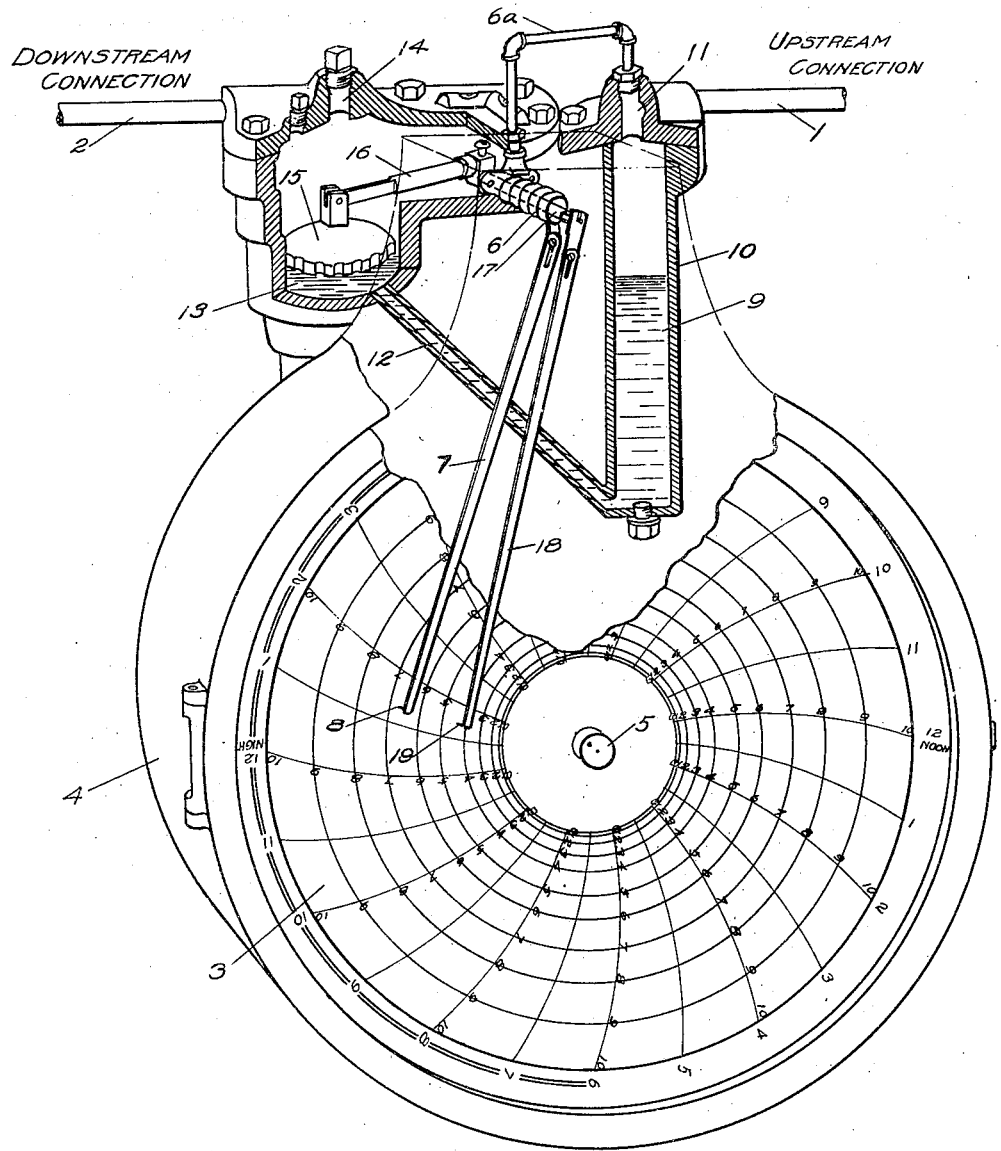
Inventor
John C. Diehl
By W. R. Lund
Attorney Patented Aug. 21, 1928.

1,681,174

UNITED STATES PATENT OFFICE.

JOHN C. DIEHL, OF ERIE, PENNSYLVANIA, ASSIGNOR TO AMERICAN METER COMPANY, INC., OF NEW YORK, N. Y., A CORPORATION OF DELAWARE.

ORIFICE METER.

Application filed December 12, 1924. Serial No. 755,393.

Orifice meters have heretofore been made recording on charts the line pressure on one side of the orifice and the difference in pressure between the up-stream side and the down-stream side of the orifice. The common practice has been to take the readings from the chart giving the pressure and differential and compute from these the flow of fluid through the meter. With the present invention I form the chart and so arrange the pen arms responding to the line pressure and the differential pressure so that the readings on the chart are the square roots of the pressures which are recorded by the pen arms or multiples of these square roots and in consequence the computation necessary to find these square roots as in the ordinary meter is obviated. Preferably I so arrange the pen arms that they will read with the same chart figures, one utilizing these figures for indicating the differential usually in inches of water and the other utilizing these same figures for the line pressure usually in pounds, or rather the square roots of these pressures.

The invention is illustrated in the accompanying drawing which shows a front elevation of the device, partly in section.

In this drawing, 1 marks the connection to the upstream line, and 2 the connection to the down stream line, the main line and the orifice not being shown. 3 marks the chart and 4 the clock mechanism operating through a shaft 5 to rotate the chart. A Bourdon tube or pressure spring 6 is connected by way of a tube 6ª with the upstream line. A pen arm 7 is actuated by the pressure spring 6 and records through a pen 8 at the end of the arm upon the chart. A U-tube 9 has the arm 10 subjected to the upstream pressure through a connection 11 and the arm 12 subjected to the down-stream pressure through a float chamber 13 and connection 14. The float chamber 13 has the usual float 15. The movement of this float is communicated by an arm 16 with a shaft 17 concentric with the spring 6. A pen arm 18 extends from the shaft 17 and is supplied with the pen 19 recording the movement of the pen arm on the chart.

The pen arm 7 is adjusted so as to assume a zero position on the chart at absolute zero pressure and the pen arm 18 assumes a zero position on the chart with a zero differential, in other words, exactly equal pressures on the two arms of the U-tube.

The chart has the usual time marks and is graduated in and out for the pen arms and these graduations are indicated with figures representing the square root of the pressures to which the pen arms actually respond, or in some instances multiples of the square roots, as shown the actual square roots.

In computing the flow through an orifice meter the formula is usually stated as $$Q = C\sqrt{hP}$$

in which
Q is the quantity of fluid flowing through the meter per unit of time,
C the coefficient representing the flow at one inch differential at one pound absolute pressure as determined through the orifice under consideration and
$h$ the inches of water differential, and
P the line pressure.

It will readily be seen, therefore, that the computations for the values of $h$ and P are directly read on the chart and this does not require computation. Further both the differential and the line pressure read with the same figures on the chart so that the chart with one set of hour lines serves for both pen arms.

It will be noted that with this means of recording the pressures the relative flow is directly recorded by the pen arms. For example, if the differential remains constant and the pressure varies the change in rate of flow is directly proportioned to the change on the record pressure line.

Another marked advantage of this chart and meter is that only one color of lines is required because there is no chance for error due to a transposing in the computation the reading of the differential and the line pressure because it is merely a computation of the two figures and the proper designation for each figure is of no consequence. As a result there is no necessity for carefully differentiating on the chart the record indicated by the differential pressure and the record indicating the line pressure.

What I claim as new is:—

1. In an orifice meter, the combination of a chart having designations based on the square roots of differential and line pressures to be recorded and starting at absolute zero; pen arms operating on said chart; and means responsive to differential pressure and line pressure actuating said pen arms, said means adjusting said pen arms to the differential and absolute zeros.

2. In an orifice meter, the combination of a chart having designations based on the square roots of differential and line pressures to be recorded, the same designations indicating both the line pressure and differential pressure upon arms operating on the chart; and means responsive to line pressure and differential pressure actuating the pen arms, said means being adjusted to move the pen arms equal distances in response to inches of water as to the differential pressure and pounds as to line pressure, said movements being based on a starting point of zero differential and absolute zero as to line pressure.

3. In an orifice meter, the combination of pen arms; means responsive to differential pressure actuating one pen arm; means responsive to line pressure actuating the other pen arm; a chart on which the movement of the pen arms is recorded, said chart having designations thereon acting with the movements to which the pen arms are adjusted to compute the flow from the records of the pen arms directly from the records and with the same treatment of the records as factors in the computation whereby differentiation as to the record made by either pen arm is obviated.

4. In an orifice meter, the combination of a chart scaled and having designations based on square roots of line pressure to be recorded and calibrated for absolute zero of pressure; a pen arm operating on said chart; and means responsive to line pressure actuating said pen arm being calibrated from absolute zero.

In testimony whereof I have hereunto set my hand.

JOHN C. DIEHL.